(12) United States Patent
Chou

(10) Patent No.: US 7,977,836 B2
(45) Date of Patent: Jul. 12, 2011

(54) SINGLE BEARING MOTOR WITH MAGNETIC ELEMENT

(75) Inventor: Chu-Hsien Chou, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days.

(21) Appl. No.: 13/023,211

(22) Filed: Feb. 8, 2011

(65) Prior Publication Data

US 2011/0121671 A1    May 26, 2011

Related U.S. Application Data

(62) Division of application No. 10/979,204, filed on Nov. 3, 2004, now Pat. No. 7,872,387.

(51) Int. Cl.
*H02K 5/16* (2006.01)
(52) U.S. Cl. .......................................... 310/90; 310/90.5
(58) Field of Classification Search ................ 310/67 R, 310/90–90.5
See application file for complete search history.

(56) References Cited

U.S. PATENT DOCUMENTS

| | | | | | |
|---|---|---|---|---|---|
| 5,998,899 | A | * | 12/1999 | Rosen et al. | 310/90.5 |
| 6,071,092 | A | * | 6/2000 | Casaro et al. | 417/423.4 |
| 6,081,057 | A | * | 6/2000 | Tanaka et al. | 310/90 |
| 6,124,658 | A | * | 9/2000 | Coenen | 310/90.5 |
| 6,265,798 | B1 | * | 7/2001 | Huang et al. | 310/90.5 |
| 6,545,381 | B1 | * | 4/2003 | Fehrenbacher | 310/90 |
| 6,630,761 | B1 | * | 10/2003 | Gabrys | 310/90.5 |
| 6,703,736 | B2 | * | 3/2004 | Wang et al. | 310/90.5 |
| 6,787,956 | B2 | * | 9/2004 | Sun | 310/90.5 |
| 7,019,423 | B1 | * | 3/2006 | Horng et al. | 310/51 |

\* cited by examiner

*Primary Examiner* — Thanh Lam

(57) ABSTRACT

A single bearing motor comprises a fan blade set, a motor set and a fan blade base. The fan blade set has a fan blade hub to join with a spindle fitting with a bearing on the outside thereof. The motor set is attached to the fan blade base and a hollow axial seat is provided in the center of the fan blade base to receive the bearing. Further, magnetic elements are disposed at the axial seat to avoid internal clearances being created for lack of a preset pressure acting on the bearing casing and balls therein. The balls and the bearing itself can run smoothly to effectively enhance motor operation.

8 Claims, 9 Drawing Sheets

SINGLE BEARING MOTOR WITH MAGNETIC ELEMENT

CROSS-REFERENCE TO RELATED APPLICATION

This application is a divisional application of application Ser. No. 10/979,204 filed on Nov. 3, 2004.

BACKGROUND OF THE INVENTION

1. Field of the Invention

The present invention is related to a single bearing motor and particularly to a motor wherein at least one magnetic element is provided in the axial seat thereof to exert a preset pressure on the bearing casing and the balls therein so that generation of internal clearances is avoided and the smooth running of the balls and the bearing are facilitated.

2. Brief Description of the Related Art

Due to rapid progress of computer information industry, the central processing unit in the information product provides much faster operation speed and heat generation becomes much more increased. Cooling device is utilized as a basic arrangement in the information product to dissipate heat. Currently, the most popular cooling device is cooling fan because of being convenient in use and low in cost. Quality of a cooling fan is entirely determined by its operational state. Unsteady motor significantly influences normal operation of the entire system or device. More specifically, motor bearing is the key factor affecting the quality and steadiness of the motor.

Generally, a ball bearing in the motor provides a plurality of balls turning in the bearing casing while the bearing runs. Internal clearances are easily generated in the bearing and affect the operation and effect of the motor, resulting in deficiencies such as vibration, noise, heat generation and abnormal power consumption.

In addition, ball vibration in the bearing can cause minor vibrating wear to the rolling channel. Thus, it is required to exert an appropriate preset pressure to solve the problem resulting from internal clearances.

SUMMARY OF THE INVENTION

An object of the present invention is to provide a single bearing motor wherein at least one magnetic element is provided in the axial seat thereof to exert a preset pressure on the bearing casing and the balls therein so that generation of internal clearances is avoided and the smooth running of the balls and the bearing are facilitated.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
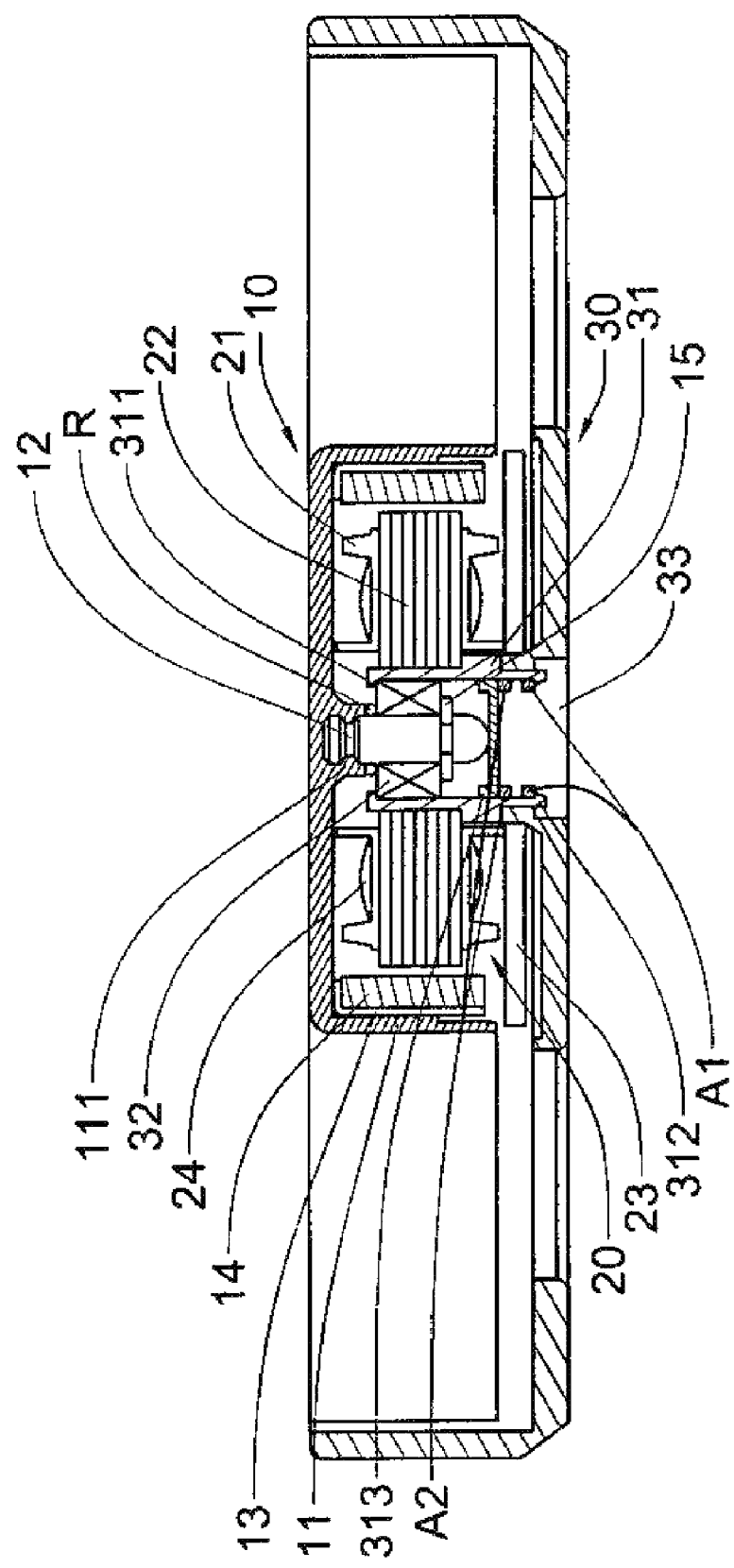
FIG. 1 is a sectional view of the first embodiment of a single bearing motor according to the present invention.

Referring to FIG. 1, the first embodiment of a single bearing motor according to the present invention comprises a fan blade set 10, a motor set 20 and a fan base 30. The fan blade set 10 is composed of a fan blade hub 11, a spindle 12, a motor casing 13 and a magnetic strip 14. The spindle 12 is attached to a spindle seat 111 at the central bottom of the fan blade hub 11. The motor casing 13 is provided at the inner side of the fan blade hub 11 and the magnetic stripe 14 is disposed at the inner side of the motor casing 13.

The motor set 20 is attached to the fan base 30 and is composed of an insulation frame 21, silicon-steel sheet 22, a circuit board 23 and a coil 24. The silicon-steel stripe 22 is disposed outside the insulation frame 21. The coil 24 and the silicon-steel stripe 22 surround the insulation frame 21. The fan base 30 has a hollow axial seat 31 at the center thereof and the circuit board 23 is disposed between the axial seat 31 and the bottom of the insulation frame 21. The spindle 12 is mounted in a receiving space of the axial seat 31. A bearing 32 is fitted between outside of the spindle 12 and the axial seat 31 with a plurality of balls (not shown) in the bearing 32 to allow the spindle 12 to rotate with the bearing 32. Further, an oil ring R is provided between the hearing 32 and the fan blade hub 11.

The axial seat 31 has a jut part 311 and an engaging piece 312 at the inner side thereof and the spindle 12 has a circular shape with a retaining ring 15 at an end thereof not connected with the fan blade hub 11. The bearing 32 can be located by way of the jut part 311 limiting the bearing 32. And, the bearing 32 interferes with the retaining ring 15 to prevent the spindle 12 from escaping from the axial seat 31 while running. The axial seat 31 has a bottom 313 to limit the end of the spindle 12 not connected with the fan lade hub 11. Magnetic elements A1 and A2 are provided between the bottom 313 and the engaging piece 312. The magnetic elements A1 and A2 provide identical magnetic poles so as to reject each other and produce a preset pressure on the bearing (including the bearing case and the balls therein). This facilitates smooth running of the balls and the bearing 32 and enhances the operational effect of the motor, such as reducing vibration, noise, heat generation and abnormal power consumption and prolonging its use life. Besides, the bottom 313 can be an independent part of the axial seat 31.

Figure 2:
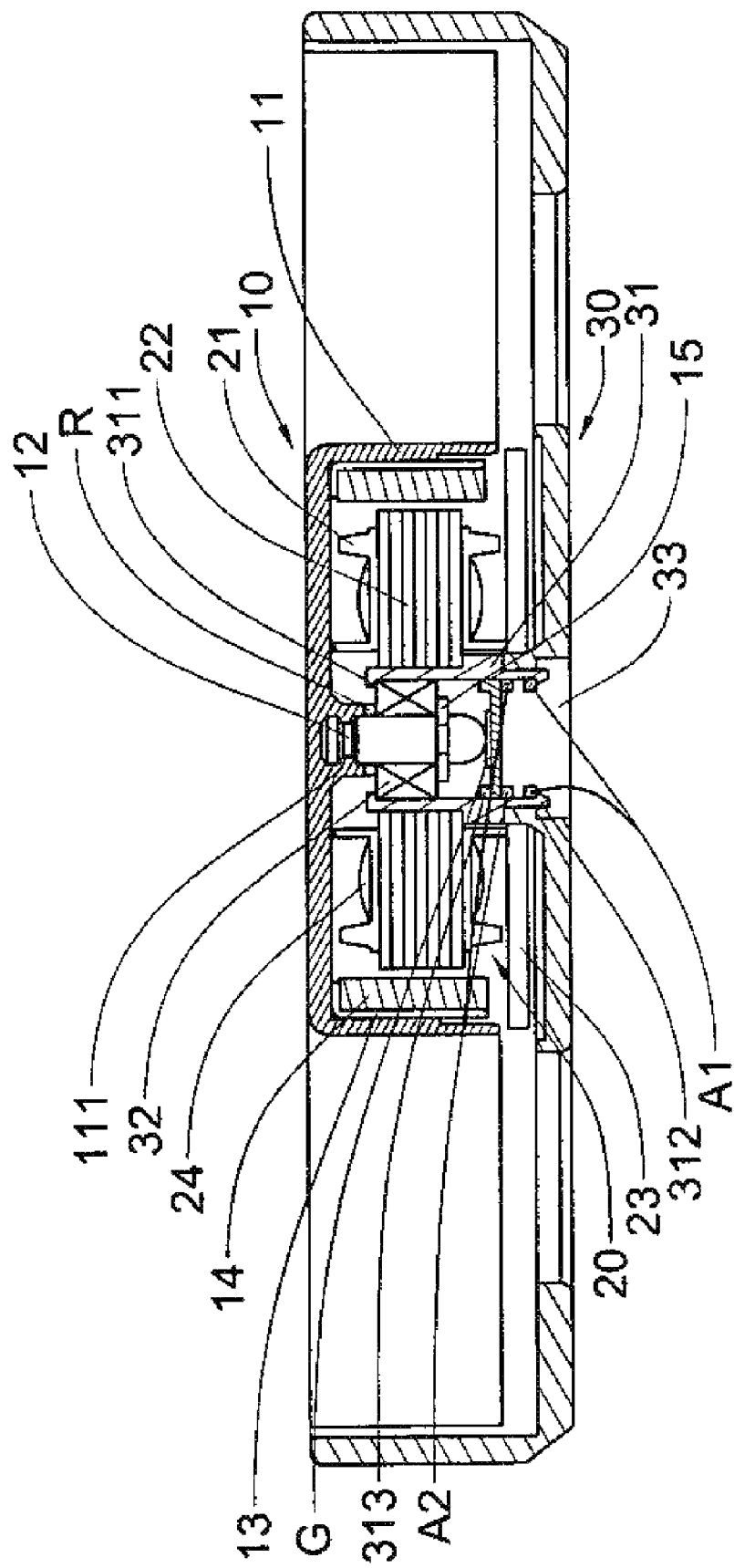
FIG. 2 is a sectional view of the second embodiment of a single bearing motor according to the present invention.

Referring to FIG. 2, the second embodiment of a single bearing motor according to the present invention is illustrated. The structure of the second embodiment is almost the same as that of the first except that a wear elastic stripe G can be added between the bottom 313 (i.e., a lateral side of the bottom 313 of the axial seat 31) and the end on the spindle 12 not connected with the fan blade hub 11, so that the spindle 12 does not touch the bottom 313 of the axial seat 31 and lessens wear of the spindle 12 or the axial seat 31.

Figure 3:
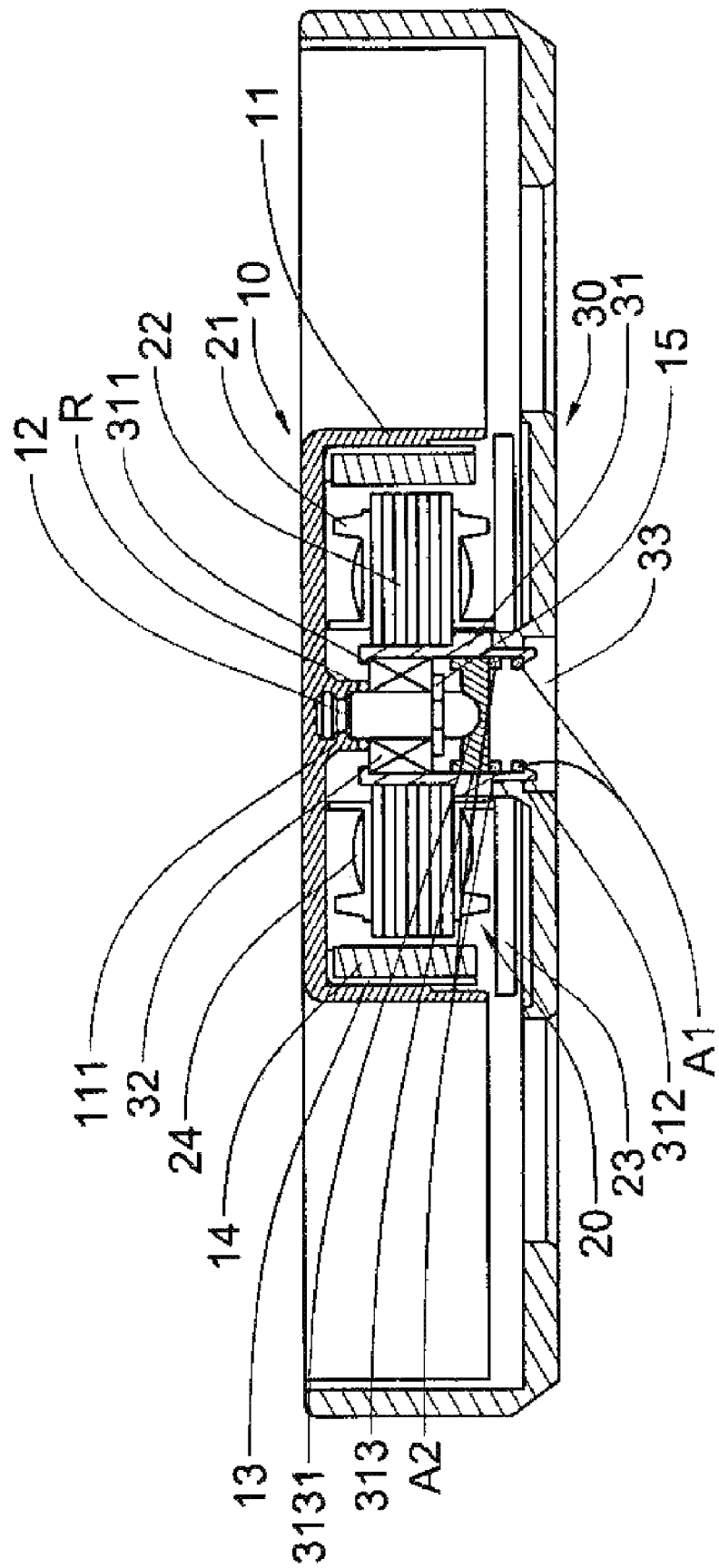
FIG. 3 is a sectional view of the third embodiment of a single bearing motor according to the present invention.

Referring to FIG. 3, the third embodiment of a single bearing motor according to the present invention is illustrated. The structure of the third embodiment is almost the same as that of the first except that the bottom 313 has a circular groove 3131 corresponding to the spindle 12 so as to connect with the spindle 12. Thus, the spindle 12 can rotate in the axial seat 31 in accordance with the circular shape of the circular groove 3131. The spindle 12 has a function of locating to constitute a steady state of rotation by way of support of the bottom 313 of the axial seat 31 and the bearing 32.

Figure 4:
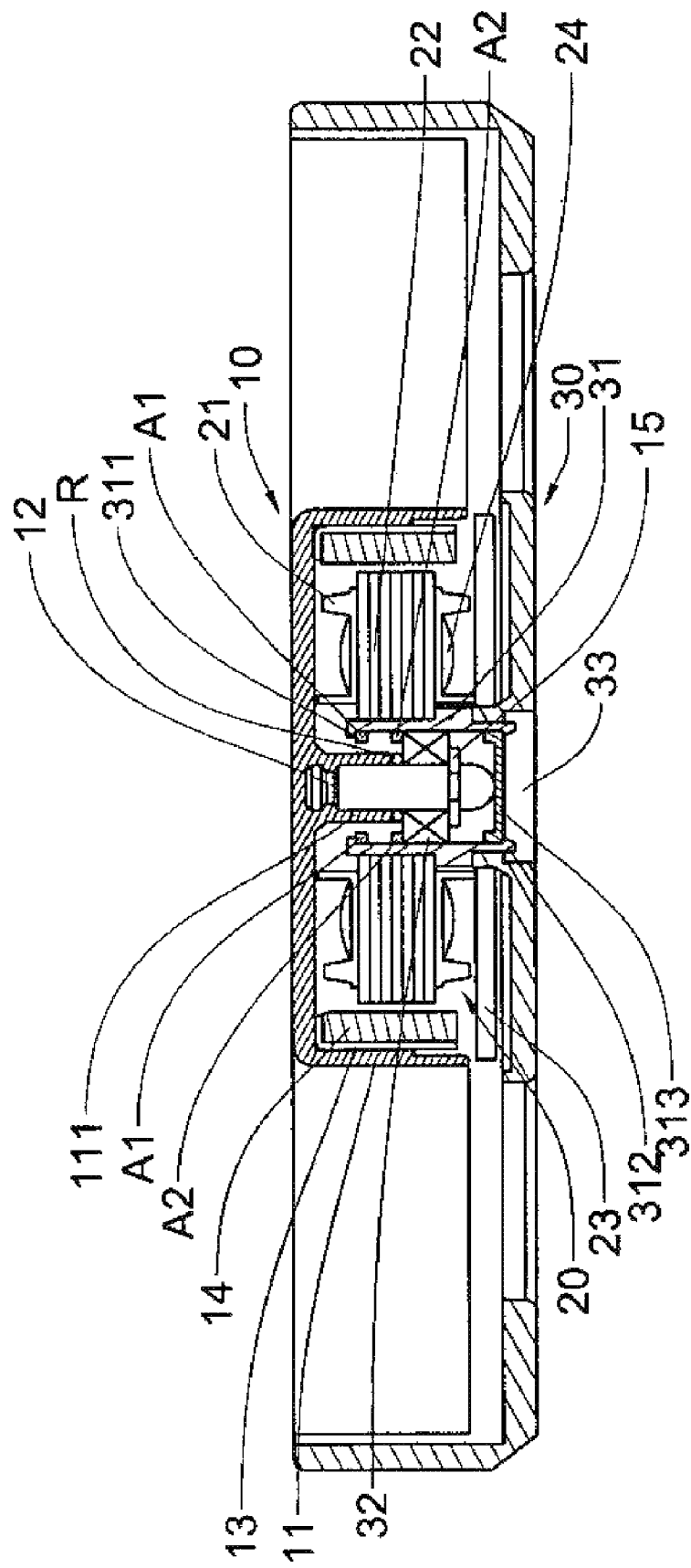
FIG. 4 is a sectional view of the fourth embodiment of a single bearing motor according to the present invention.
Figure 5:
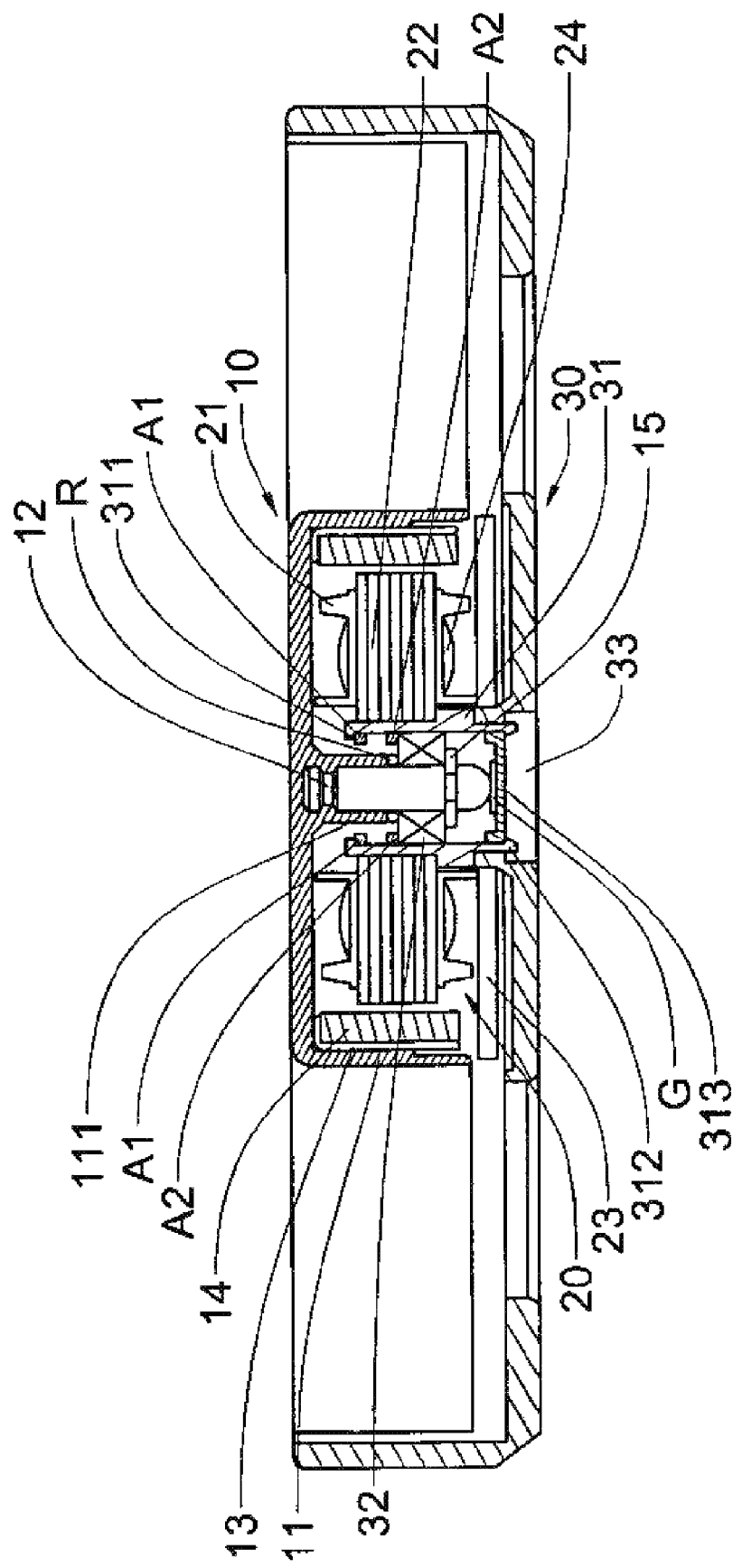
FIG. 5 is a sectional view of the fifth embodiment of a single bearing motor according to the present invention.

Referring to FIG. 4, the fourth embodiment of a single bearing motor according to the present invention is illustrated. The structure of the fourth embodiment is almost the same as that of the first except that the magnetic elements A1 and A2 are provided between the jut part 311 and the bearing 32. Further, referring to FIG. 5, a wear elastic stripe G can be added between the bottom 313 (i.e., a lateral side of the bottom 313 of the axial seat 31) and the end on the spindle 12 not connected with the fan blade hub 11 so that the spindle 12 do not touch the bottom 313 of the axial seat 31.

Figure 6:
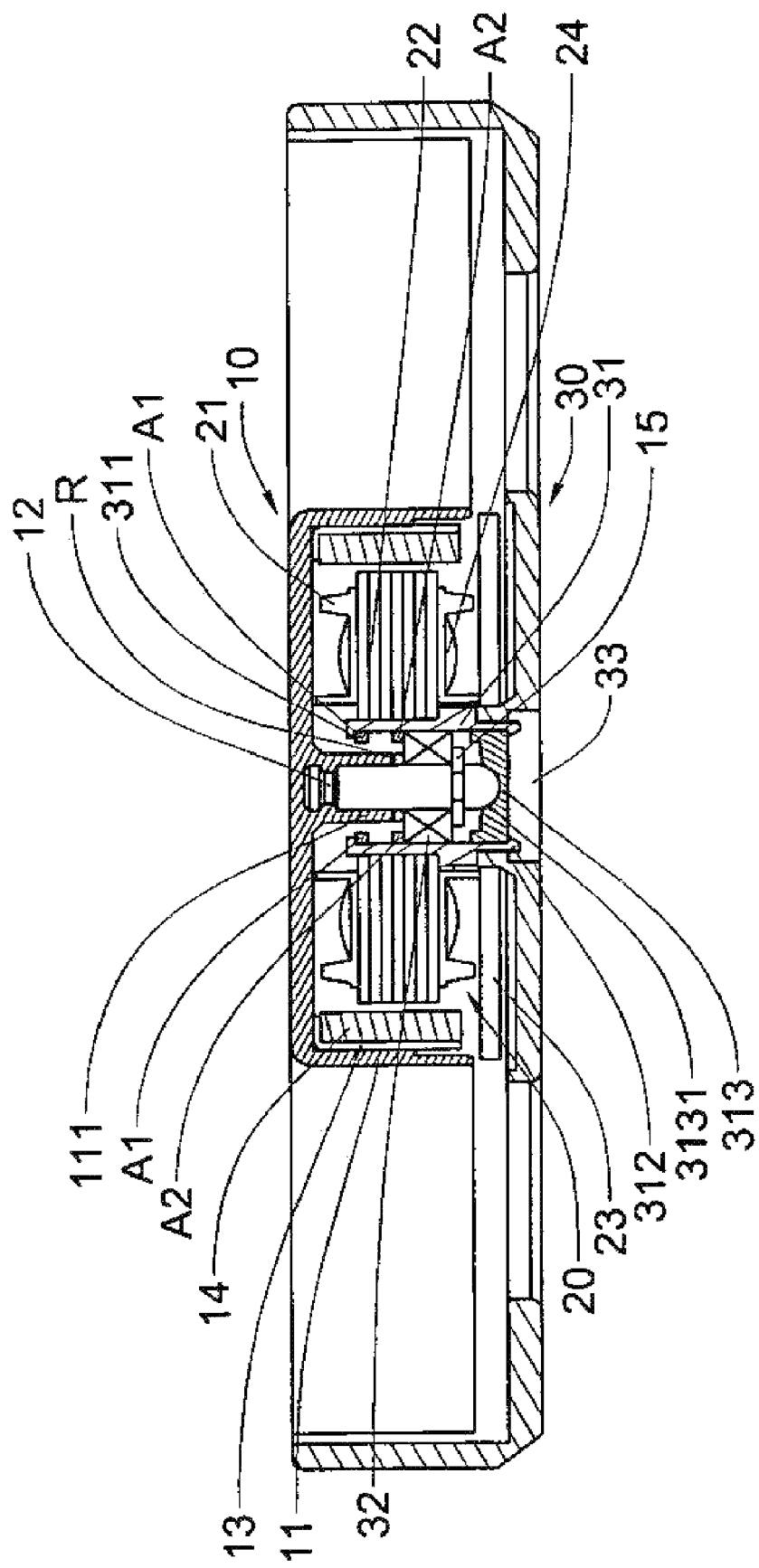
FIG. 6 is a sectional view of the sixth embodiment of a single bearing motor according to the present invention.

Referring to FIG. 6, the sixth embodiment of a single bearing motor according to the present invention is illustrated. The structure of the sixth embodiment is almost the same as that of the fourth except that the bottom 313 has a circular groove 3131 corresponding to the spindle 12 so as to connect with the spindle 12. Thus, the spindle 12 can rotate in the axial seat 31 in accordance with the circular shape of the circular groove 3131.

Figure 7:
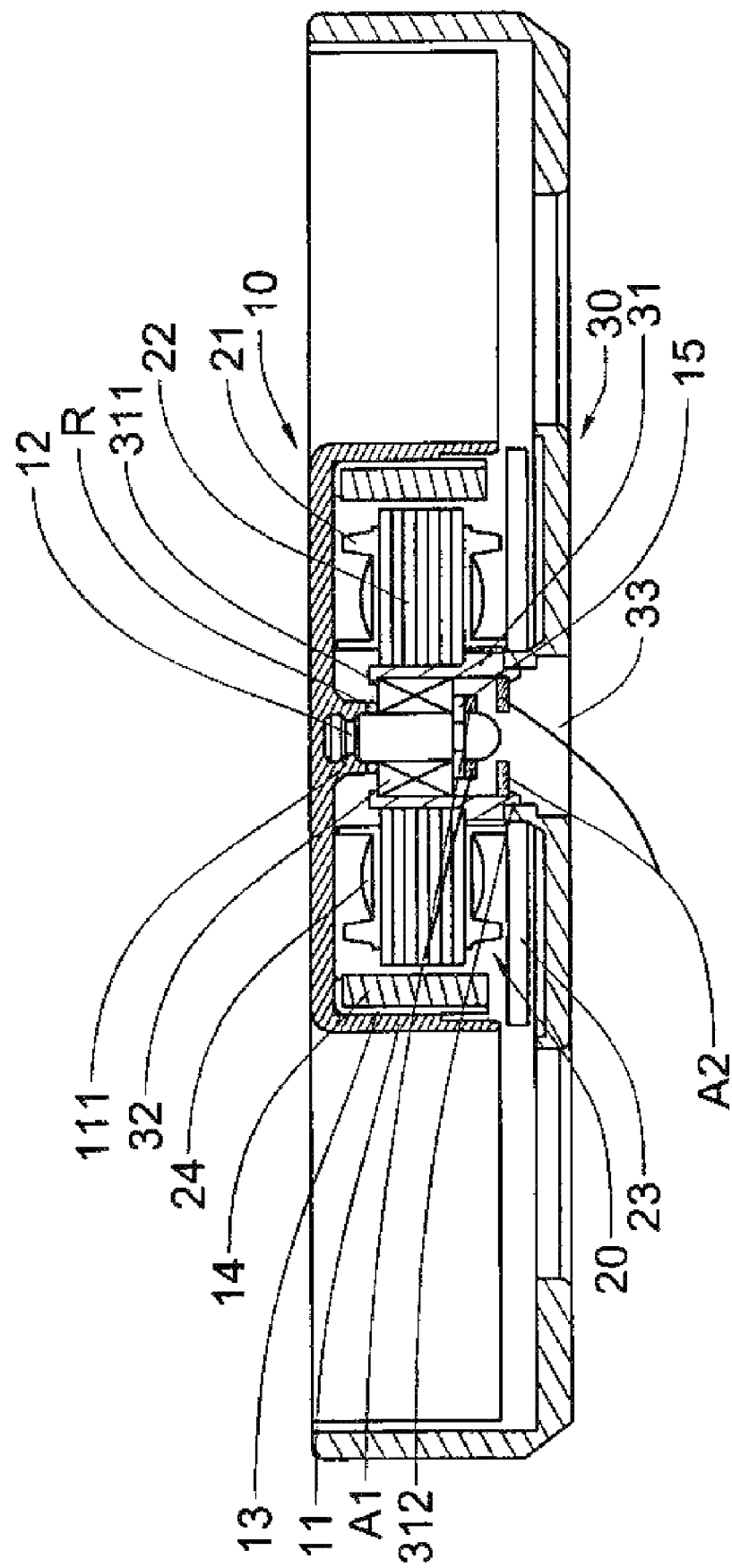
FIG. 7 is a sectional view of the seventh embodiment of a single bearing motor according to the present invention.

Referring to FIG. 7, the seventh embodiment of a single bearing motor according to the present invention is illustrated. The structure of the seventh embodiment is almost the same as that of the first except that the bearing 32 can be located by way of the jut part 311 limiting the bearing 32 and the bearing 32 interferes with the retaining ring 15 to prevent the spindle 12 from escaping from the axial seat 31 while running. It is noted that the axial seat 31 in the present embodiment is provided without the bottom 313. Besides, the magnetic elements A1 and A2 are provided between the engaging piece 312 and the periphery of an end on the spindle 12 not connected with the fan blade hub 11. It is noted that the edge can facially contact with the retaining ring 15.

Figure 8:
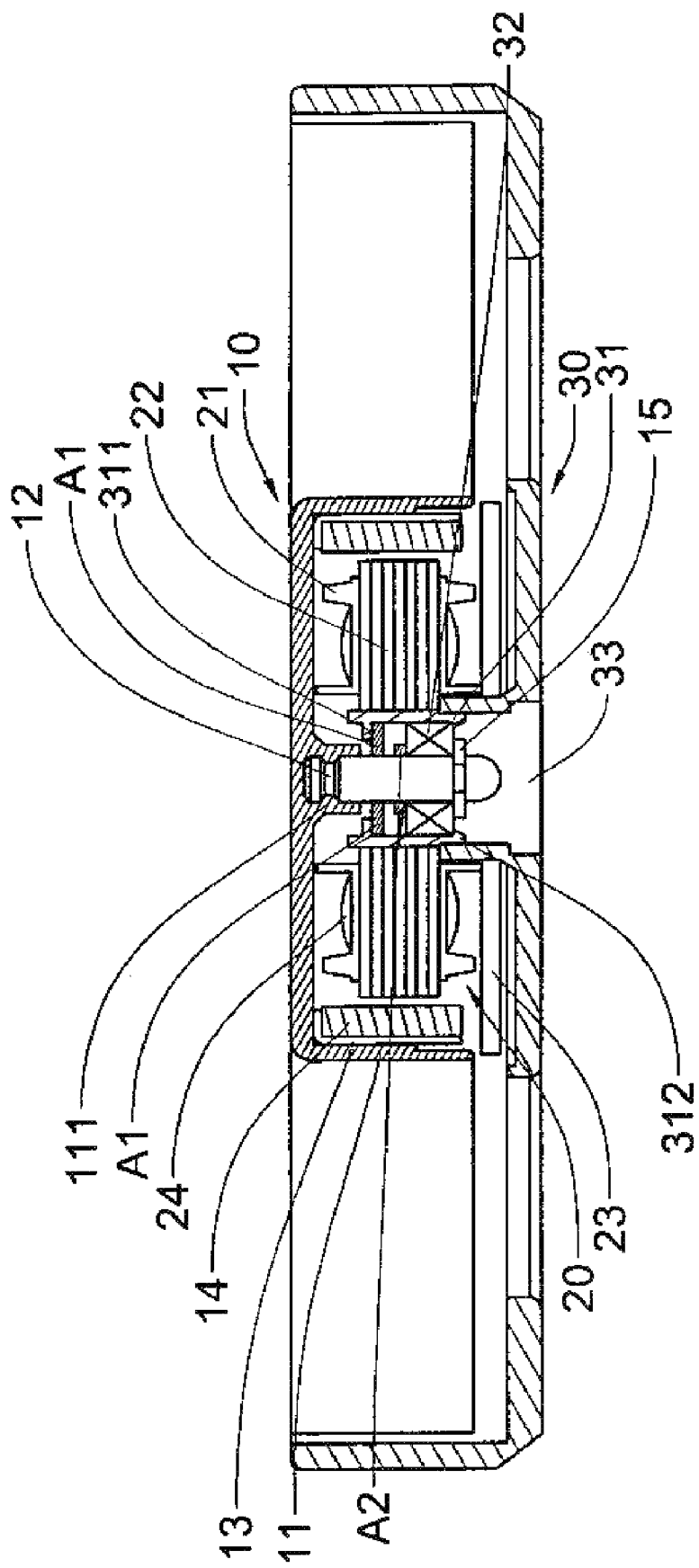
FIG. 8 is a sectional view of the eighth embodiment of a single bearing motor according to the present invention.

Referring to FIG. 8, the eighth embodiment of a single bearing motor according to the present invention is illustrated. The structure of the eighth embodiment is almost the same as that of the seventh except that the magnetic elements A1 and A2 are provided between the jut part 311 and the bearing 32.

Figure 9:
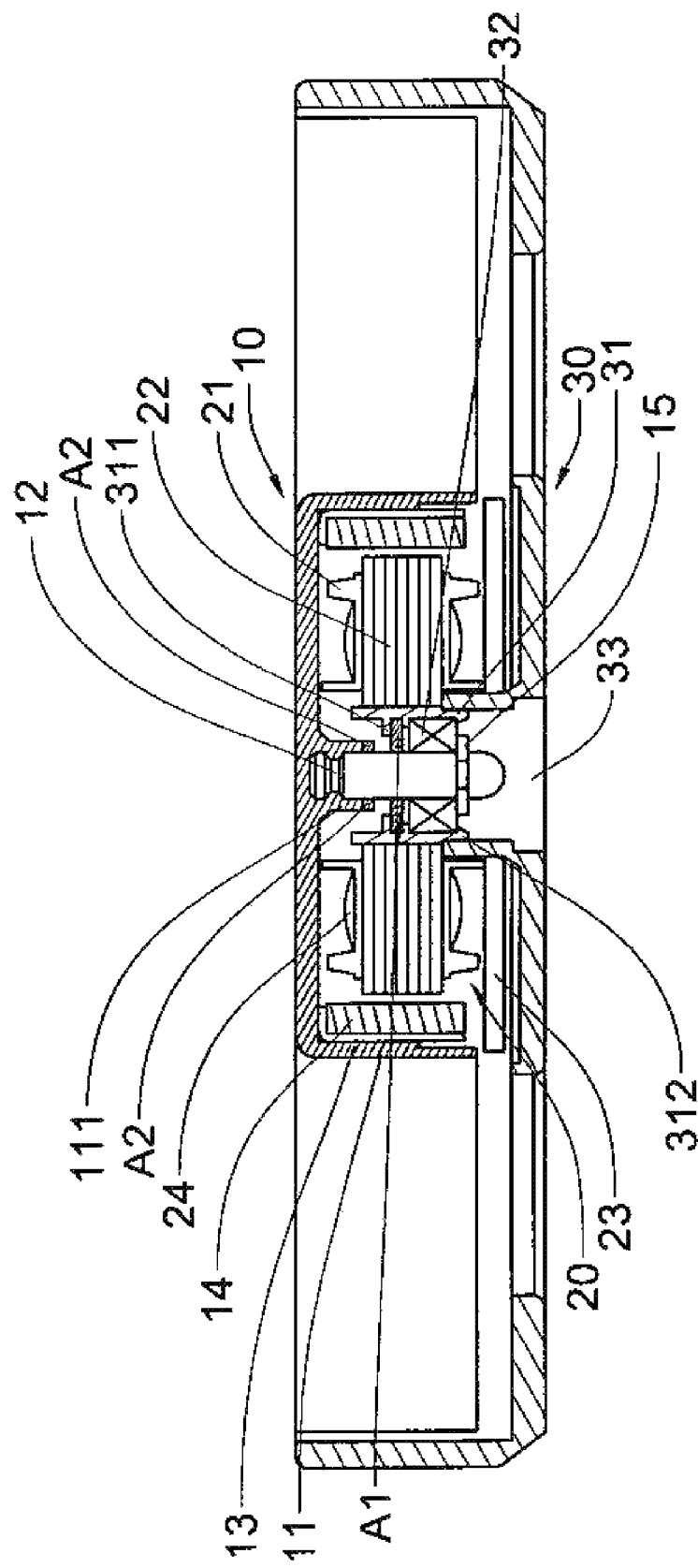
FIG. 9 is a sectional view of the ninth embodiment of a single bearing motor according to the present invention.

Referring to FIG. 9, the ninth embodiment of a single bearing motor according to the present invention is illustrated. The structure of the ninth embodiment is almost the same as that of the eighth except that the magnetic element A2 is provided at the inner side of the axial seat 111.

While the invention has been described with referencing to preferred embodiments thereof, it is to be understood that modifications or variations may be easily made without departing from the spirit of this invention defined in the appended claims.

What is claimed is:

1. A single bearing motor comprising:
 a spindle;
 a fan base, providing a hollow axial seat with a receiving space for receiving the spindle and the inner side of the axial seat further providing a jut part;
 a bearing, providing a casing with a plurality of balls being in the casing and fitting with the spindle to bear the spindle during the spindle rotating;
 characterized in that a plurality of magnetic elements are provided between the bearing and the jut part in the axial seat to constitute a preset pressure to the casing and the balls in the hearing casing by way of the magnetic elements repulsing to each other due to identical magnetic poles;
 whereby, it prevents the bearing from creating internal clearances to keep the balls in the bearing in a steady state of running such that the operation of the motor can be enhanced effectively.

2. The motor with single bearing as defined in claim 1, wherein an end of the spindle is joined with a fan blade set.

3. The motor with single bearing as defined in claim 2, wherein the fan blade set has a fan blade hub with an axial seat at the central bottom thereof and the magnetic elements are provided between the bearing and an inner side of the axial seat.

4. The motor with single bearing as defined in claim 1, wherein the axial seat has an engaging piece at the inner side thereof and the magnetic elements are provided between the engaging piece and the periphery of the spindle.

5. The motor with single bearing as defined in claim 4, wherein the spindle is attached with a retaining ring at the periphery thereof.

6. The motor with single bearing as defined in claim 4, wherein the axial seat has a bottom between the spindle and the engaging piece and the magnetic elements are provided between the bottom of the axial seat and the engaging piece.

7. The motor with single bearing as defined in claim 6, wherein the bottom of the axial seat is provided with a wear elastic stripe at a lateral side thereof.

8. The motor with single bearing as defined in claim 6, wherein the spindle is provided with a circular shape at an end thereof and the axial seat is provided with a circular groove at the bottom thereof corresponding to and connecting with the end of circular shape on the spindle.

* * * * *